United States Patent [19]

Goren et al.

[11] Patent Number: 5,262,626
[45] Date of Patent: Nov. 16, 1993

[54] DECODING BAR CODES FROM MULTIPLE SCANS USING ELEMENT REPLACEMENT

[75] Inventors: David P. Goren, Ronkonkoma; Theodosios Pavlidis, Setauket; Glenn Spitz, Far Rockaway, all of N.Y.

[73] Assignee: Symbol Technologies, Inc., Bohemia, N.Y.

[21] Appl. No.: 421,269

[22] Filed: Dec. 6, 1989

[51] Int. Cl.⁵ .............................................. G06K 7/10
[52] U.S. Cl. .................................... 235/462; 235/437
[58] Field of Search ............... 235/436, 437, 462, 463, 235/466, 467, 472

[56] References Cited

U.S. PATENT DOCUMENTS

| | | | |
|---|---|---|---|
| 3,938,089 | 2/1976 | McGregor et al. | 382/62 |
| 3,949,363 | 4/1976 | Holm | 382/62 |
| 4,239,151 | 12/1980 | Enser et al. | 235/437 |
| 4,251,798 | 2/1981 | Swartz et al. | 340/146 |
| 4,308,455 | 12/1981 | Bullis et al. | 235/463 |
| 4,329,574 | 5/1982 | Jordan, Jr. | 235/463 |
| 4,360,798 | 11/1982 | Swartz et al. | 340/146.3 |
| 4,369,361 | 1/1983 | Swartz et al. | 235/470 |
| 4,387,297 | 6/1983 | Swartz et al. | 235/462 |
| 4,408,342 | 10/1983 | Grabowski et al. | 382/62 X |
| 4,409,469 | 10/1983 | Yasuda et al. | 235/463 |
| 4,409,470 | 10/1983 | Shepard et al. | 235/472 |
| 4,421,978 | 12/1983 | Laurer et al. | |
| 4,460,120 | 7/1984 | Shepard et al. | 235/472 |
| 4,488,678 | 12/1984 | Hara et al. | 235/463 |
| 4,496,831 | 1/1985 | Swartz et al. | 235/472 |
| 4,500,776 | 2/1985 | Laser | 235/162 |
| 4,593,186 | 6/1986 | Swartz et al. | 235/472 |
| 4,673,805 | 6/1987 | Shepard et al. | 235/472 |
| 4,717,818 | 1/1988 | Broockman | 235/462 |
| 4,736,095 | 4/1988 | Shepard et al. | 235/472 |
| 4,746,789 | 5/1988 | Gieles et al. | 235/463 |
| 4,753,498 | 6/1988 | Swartz et al. | 350/6.8 |
| 4,758,717 | 7/1988 | Shepard et al. | 235/472 |
| 4,760,248 | 7/1988 | Swartz et al. | 235/472 |
| 4,901,073 | 2/1990 | Kibrick | 341/13 |
| 4,916,297 | 4/1990 | Tukada et al. | 235/463 X |
| 4,967,074 | 10/1990 | von Stein | |
| 4,973,829 | 11/1990 | Ishida et al. | 235/467 X |
| 5,028,772 | 7/1991 | Lapinski et al. | 235/467 |
| 5,045,677 | 9/1991 | Okamura | 235/462 |

FOREIGN PATENT DOCUMENTS

| | | |
|---|---|---|
| 0072910 | 3/1983 | European Pat. Off. . |
| 0250778 | 1/1988 | European Pat. Off. . |
| 0304804 | 3/1989 | European Pat. Off. . |
| 60-08661 | 5/1985 | Japan . |

Primary Examiner—Davis L. Willis
Assistant Examiner—Edward H. Sikorski

[57] ABSTRACT

A method for reading bar code symbols which enables legitimate characters recognized by the code in use to be derived from a plurality of scans corresponding to illegitimate characters not recognized by the code in use is disclosed. The method includes the steps of storing representations of the bar code symbol which cannot be decoded to produce legitimate character(s). One of the representations is improved, or corrected, using another representation, and an attempt is made at decoding the corrected representation to produce a legitimate character. If the decoding attempt is not successful, further corrections are made in order to provide a representation which may be decoded to produce a legitimate character.

39 Claims, 13 Drawing Sheets

| CHAR. | PATTERN | BARS | SPACES | CHAR. | PATTERN | BARS | SPACES |
|---|---|---|---|---|---|---|---|
| 1 | | 10001 | 0100 | M | | 11000 | 0001 |
| 2 | | 01001 | 0100 | N | | 00101 | 0001 |
| 3 | | 11000 | 0100 | O | | 10100 | 0001 |
| 4 | | 00101 | 0100 | P | | 01100 | 0001 |
| 5 | | 10100 | 0100 | Q | | 00011 | 0001 |
| 6 | | 01100 | 0100 | R | | 10010 | 0001 |
| 7 | | 00011 | 0100 | S | | 00110 | 0001 |
| 8 | | 10010 | 0100 | T | | 01010 | 0001 |
| 9 | | 00110 | 0010 | U | | 10001 | 1000 |
| 0 | | 01010 | 0010 | V | | 01001 | 1000 |
| A | | 10001 | 0010 | W | | 11000 | 1000 |
| B | | 01001 | 0010 | X | | 00101 | 1000 |
| C | | 11000 | 0010 | Y | | 10100 | 1000 |
| D | | 00101 | 0010 | Z | | 01100 | 1000 |
| E | | 10100 | 0010 | - | | 00011 | 1000 |
| F | | 01100 | 0010 | . | | 10010 | 1000 |
| G | | 00011 | 0010 | SPACE | | 00110 | 1000 |
| H | | 10010 | 0010 | * | | 01010 | 1000 |
| I | | 00110 | 0010 | $ | | 00000 | 1110 |
| J | | 01010 | 0010 | / | | 00000 | 1101 |
| K | | 10001 | 0001 | + | | 00000 | 1011 |
| L | | 01001 | 0001 | % | | 00000 | 0111 |

THE * SYMBOL DENOTES A UNIQUE START/STOP CHARACTER WHICH MUST BE THE FIRST AND LAST CHARACTER OF EVERY BAR CODE SYMBOL.

FIG. 2

DECODING BAR CODES FROM MULTIPLE SCANS USING ELEMENT REPLACEMENT

FIELD OF THE INVENTION

The present invention relates generally to the scanning of bar code symbols and more particularly to an improved error correcting method for decoding bar code symbols which uses information derived from a plurality of scan signals corresponding to illegitimate characters. Such information enables illegitimate characters of a scanned bar code symbol to be iteratively replaced with legitimate characters to yield a decoded bar code symbol having only legitimate characters.

BACKGROUND OF THE INVENTION

Bar code symbols are presently widely used to label items for automated product identification. A bar code symbol consists of a sequence of light and dark regions referred to as elements or bars. These elements are typically rectangular in shape and often have a variety of possible widths. An arrangement of elements represents a character and is determined according to a set of rules and definitions typically referred to as a "code". A variety of codes such as the Universal Product Code (UPC) and Code 39 exist and provide a degree of uniformity.

More specifically, codes define a set of characters wherein each character is depicted and defined by a unique arrangement of elements. To encode a desired message having a number of characters, a collection of element arrangements are concatenated to form a bar code symbol, with each character of the message being represented by its own corresponding group of elements.

Characters recognized and defined by a code are referred to as legitimate characters while characters not recognized and defined by a code are referred to as illegitimate characters. Thus, an arrangement of elements not decodable by a given code corresponds to an illegitimate character(s) for that code.

In decoding the bar code symbol to extract a legitimate character message, a bar code reading device first scans the symbol and generates an electrical analog scan signal representative of the symbol. Next, the reading device and associated components attempt to decode the message from this analog scan signal according to the protocol of the code in use. A legitimate character message consists of one or more characters, each of which must be legitimate.

In particular, to generate the analog scan signal representative of the bar code symbol, the reading device scans the bar code symbol with a light source. A wide variety of light sources as well as sweeping devices arid methods may be employed. Illustratively, a laser is employed to sweep a laser beam across the symbol. As the laser beam scans the symbol, an optical sensor receives the light reflected by the elements of the symbol and generates the analog scan signal which is a function of the intensity of the reflection. A converter monitors and/or modifies this analog scan signal, detecting changes in the intensity of the reflected light as the laser crosses the boundary between two adjacent elements. By measuring and storing the amount of time between each such change in intensity, the converter creates a representation, referred to as a raw converted image, of the bar code symbol. Advantageously, the output of the converter is in a form suitable for decoding by a decoder. Illustratively, the amount of time between changes in intensity is measured in counts.

The converter may be a digitizer which creates a digital representation, referred to as a raw digital image, of the bar code symbol.

The decoder then compares this raw digital image against legitimate character image(s) as defined by the pertinent code. Unfortunately, any of a variety of sources of error, defects, and the like, singly and collectively referred to as distortion, may corrupt the above described scanning process and produce distorted analog scan signals and/or distorted digital images such that the raw digital image does not completely and accurately represent the bar code symbol being read. The decoder, unable to match the raw digital image with legitimate character image(s), will then indicate a decode failure. Preferably, the decoder performs this comparison on a character by character basis.

Specifically, a decode failure exists when the decoder is unable to decipher the output of the converter, i.e., when the decoder is unable to match the output of the converter with character images which are included in the specific code in use. Such character images which are included in and recognized by the specific code in use are referred to :s legitimate or valid characters. Thus, if a decode failure occurs, the character which was attempted to be decoded was an invalid character and the bar code symbol cannot be properly read.

Upon registering a decode failure, conventional bar code readers discard the entire distorted raw digital image and repeat the entire process described above until a scan is produced which is sufficiently free from distortion such that the decoder can match legitimate character image(s) with the raw digital image. Such legitimate character images are typically stored in or accessible to the decoder. However, this method is unnecessarily time consuming, particularly in circumstances where it is difficult to obtain a scan which is not distorted.

Difficulties associated with the inability to read a bar code symbol or the erroneous reading of a bar code symbol are especially common in applications involving relatively long bar code messages, i.e., bar code symbols having numerous elements. As the length of the message increases, the number of elements and characters increases, thereby raising the likelihood that distortion will be introduced at some point during the scan. Accordingly, the bar code reader may scan the symbol numerous times before producing a raw digital image sufficiently free from distortion that it can be decoded.

Further, bar code symbols may contain printing defects which are arranged such that it is unlikely to obtain a single distortion free scan, i.e., valid characters cannot be produced and the bar code cannot be read. Additionally, the bar codes may be printed in a dot matrix style in which case the ability to read the bar codes depends on the resolution of the print. Using conventional methods of decoding, such bar code symbols are often unreadable since readings thereof do not result in valid characters.

SUMMARY OF THE INVENTION

The present invention relates to an error correcting method enabling illegitimate characters read in a bar code symbol to be iteratively replaced with legitimate characters so as to provide a decoded bar code symbol having only legitimate characters. Specifically, the method quickly and accurately decodes bar code symbols by iteratively employing distorted and otherwise useless bar code readings to efficiently produce a corrected bar code reading by replacing illegitimate characters with legitimate characters. The method includes the steps of storing first and second raw converted images representative of first and second analog scan signals, respectively. The first raw converted image is then corrected, or improved, using the second raw converted image to form a corrected, or improved, first converted image. The term imagell as used herein with respect to the invention includes any representation, modification or derivation of the analog scan signal.

Correction of a distorted raw converted image is performed by modifying at least one element of a distorted character of the first distorted raw converted image based on at least one element of the corresponding character of the second distorted raw converted image to form the corrected first converted image. In many instances, the entire bar code symbol can then be accurately decoded from this corrected first converted image.

However, if a decode failure is encountered in attempting to decode this corrected first converted image, the corrected first converted image may be used to correct, or improve, the second distorted raw converted image. If this correction is successful, an attempt is made to decode the entire bar code symbol using the corrected second converted image.

In one embodiment of the invention, the above steps are repeated until either the entire bar code symbol is decoded, or until it becomes apparent that a complete decode is impossible using the two available images or any corrected versions thereof. In the event a decode failure occurs, i.e., a complete decode is impossible, an attempt is made to classify the two corrected images as a relatively clear image and a relatively distorted image, wherein the relatively clear image comprises at least one undistorted element corresponding to a distorted element in the relatively distorted image.

If one of the corrected images can be defined as relatively clear, an attempt is made to correct the relatively distorted image using the relatively clear image, and, if successful, an attempt is made to decode the relatively distorted image. Each time a decode failure is encountered an attempt is made to redefine the two images as relatively clear and relatively distorted images. In this embodiment, repeated attempts are made to correct and decode the relatively distorted image until the decode is successful or until neither corrected image can be defined as relatively clear.

Accordingly, it is a principal object of the invention to provide a new and improved method for decoding bar code symbols.

Another object of the invention is to provide an improved error correcting method for decoding bar code symbols.

A further object of the invention is to provide an error correcting method for decoding bar code symbols which enables legitimate characters to replace illegitimate characters which were read.

A still further object of the invention is to provide an improved method for decoding bar code symbols which compares a plurality of distorted images which cannot be individually decoded and forms a corrected image which can be decoded to produce a legitimate character message.

BRIEF DESCRIPTION OF THE DRAWINGS

These and other objects, features and advantages of the invention will become more readily apparent from the following detailed description of the invention in which:

FIG. 2 is a table depicting the images of all characters as defined by the Code 39;

DETAILED DESCRIPTION OF THE PREFERRED EMBODIMENT

Figure 1:
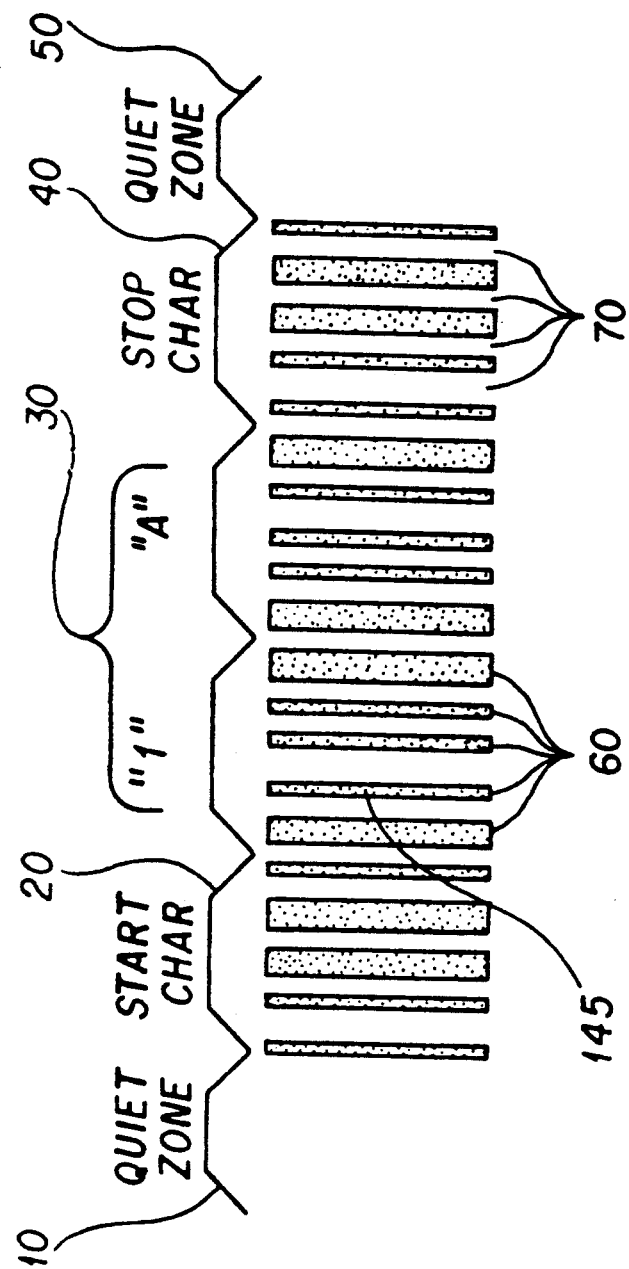
FIG. 1 depicts an illustrative bar code symbol in the Code 39 format.

The present invention may be used with a wide variety of different coding schemes. However, for purposes of illustration, the invention will be described using Code 39, in which individual elements have two possible widths. Referring to FIG. 1, a typical Code 39 symbol consists of a leading quiet zone 10, a start character 20, appropriate data characters 30, a stop character 40, and a trailing quiet zone 50.

Referring now to FIGS. 1 and 2, each character of Code 39 is represented by nine elements, five bars 12 and four spaces 14. Further, each element has two possible states, wide or narrow. While there are five hundred and twelve unique combinations of nine such binary elements, Code 39 uses only forty-four to define its character set. Accordingly, there exists forty-four legitimate characters recognized by Code 39 and 468 illegitimate characters.

Figure 3A:
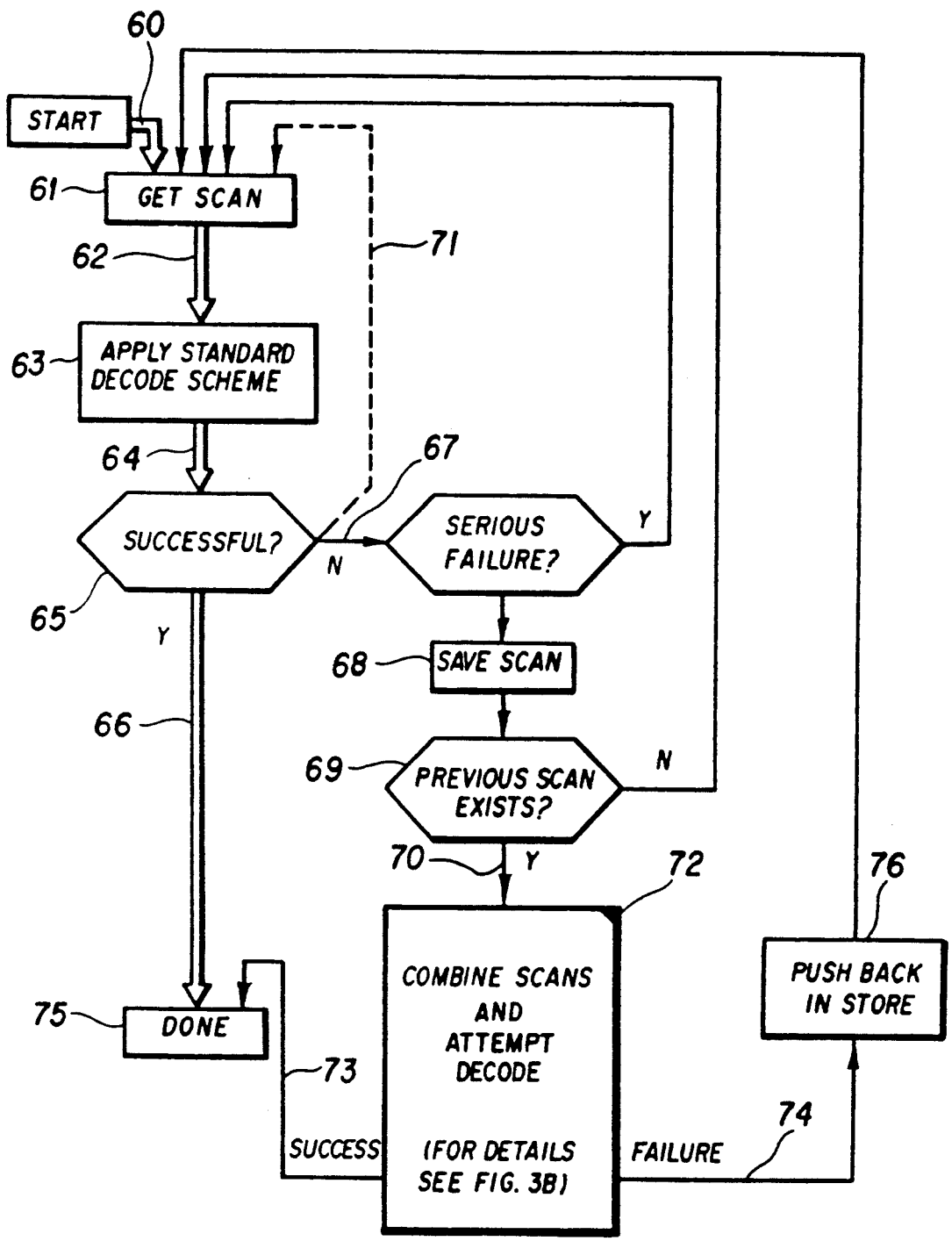
FIGS. 3A and B are a flowchart depicting an overview of the invention.

FIGS. 3A and B depict a flowchart illustrating an overview of the invention. In FIG. 3A, double lines 60, 62, 64 and 66 correspond to conventional processing steps employed in this invention while dashed line 71 corresponds to processing steps eliminated from a conventional decoding algorithm. The remainder of this figure depicts improvements added by way of the present invention.

As in conventional decode algorithms, the method of the present invention first performs a standard decode attempt on every scan sent to the decoder (61, 63). If the result of this decode attempt is a completely decoded scan, no further processing is required (65, 66). If, however, the result of this decode is a partially decoded scan, the scan is saved for further passing (65, 67, 68). The matching algorithm continues to perform decode attempts until two partially decoded scans have been saved (69, 70) or until a complete decode is achieved.

Whenever the algorithm has two partially decoded scans saved, it attempts to combine them into a single scan using an error detection and correction scheme (72). The result of this combination is either a completely decoded scan (73) or a new partially decoded scan (74). If the result is a martially decoded scan (74), the scan is saved (76) and standard decode attempts are performed until a second partially decoded scan is saved. When this occurs, the algorithm again has two partially decoded scans saved and will try to combine them.

This algorithm continues until no more scans are available or a completely decoded scan is found (73, 75) either by the standard decode attempt or by combining partial scans.

Figure 3B:
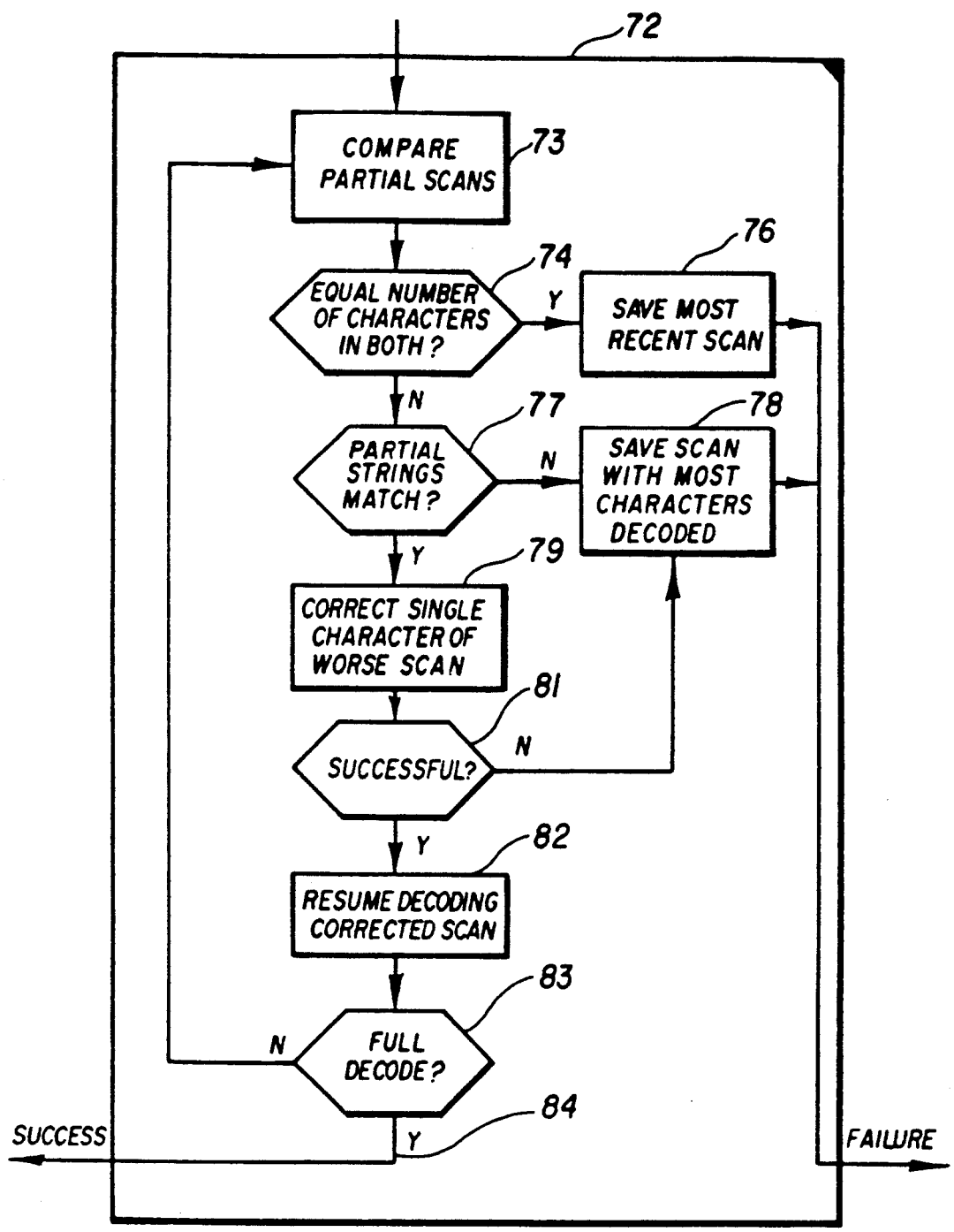

Referring now to FIG. 3B, the error detection and correction scheme (72) of FIG. 3A is depicted in detail. The two partial scans are first compared (73) for equality of length, i.e., equality in the number of decoded characters (74). If equality exists, the most recent scan is saved (76) and the older is discarded. If equality does not exist, the partially decoded strings are compared (77). If the partially decoded strings do not match on their decoded parts, the scan with the longest decoded string is saved (78) and the other is discarded. If the partially decoded strings do match, an attempt is made to correct (79) one illegitimate character in one of the scans by using a correctly decoded legitimate character in the other scan. If this is not successful (81, 78), the longest decoded string is saved and the other is discarded. If this is successful (81, 82), an attempt is made to decode the corrected scan (82). If this attempt is not successful, i.e., a full decode does not result, and the previous partial scan is compared with the corrected scan as described above (83, 73). If a full decode does result, the bar code symbol has been successfully decoded (83, 84).

More specifically, correction of a single character (79) uses the elements of a successfully decoded character in one scan to correct the elements of an illegitimate character in another scan. Once an illegitimate character has been corrected, decoding can resume. The scan with more decoded, i.e., legitimate, characters is referred to as scan A and the other scan as scan B. In this regard, two variants of the method for correcting a single character (79) may be employed: (1) The entire length of a correctly decoded character in scan A is used to delimit elements in scan B. Then the correctly decoded character is copied from the decoded string of scan A to the decoded string of scan B; or (2) Individual elements of scan A are compared with individual elements of scan B and an effort is made to identify the specific cause of error such as merge, divide, edge shift and the like. Then the elements are corrected and a new decode attempt is made.

Figure 4:
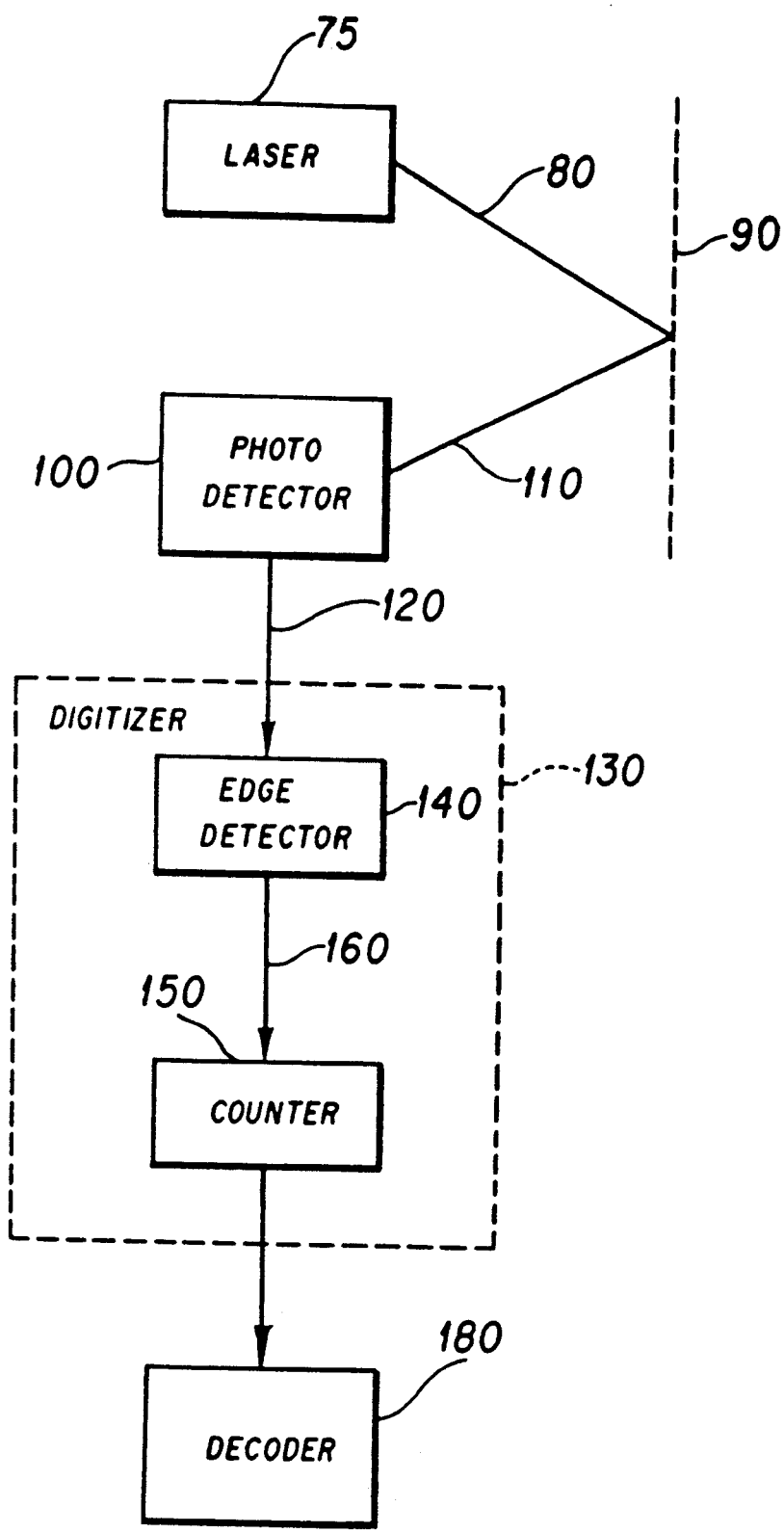
FIG. 4 is a block diagram depicting components of a conventional bar code reading device.

Referring to FIG. 4, a conventional bar code reader comprises a laser 75, a photodetector 100, a digitizer 130 and a decoder 180. Digitizer 130 comprises an edge detector 140 and a counter 150.

Laser 75 of the bar code reading device generates an incident laser beam 80 which is swept across a bar code symbol 90. Photo detector means 100 receives a reflected laser beam 110 from bar code symbol 90, and generates an analog scan signal which varies in accordance with changes in the intensity of reflected beam 110.

The analog scan signal is input to a converter such as digitizer 130 by way of line 120. Digitizer 130, using an edge detector 140 and counter 150, detects when incident laser beam 80 crosses a boundary 145 (See FIG. 1) between any two elements. Since the rate at which the laser beam is swept over the bar code is generally constant, the travel time between two boundaries of an element is proportional to the width of the element defined by such boundaries. Accordingly, to provide a digital representation of the width of each element, edge detector 140 controls counter 150 so that the counter may measure the time interval between element boundaries. Specifically, at a first boundary, counter 150, after being initialized to zero, begins incrementing and continues incrementing as the laser sweeps across the element being measured. At the next boundary, counter 150 receives a stop signal by way of line 160 from edge detector 140. Counter 150 then stores its present count which is representative of the width of the previously scanned element. The above cycle is repeated for all elements of the bar code symbol to form a raw digital image of the bar code. This raw digital image may or may not be distorted.

Figure 5A:
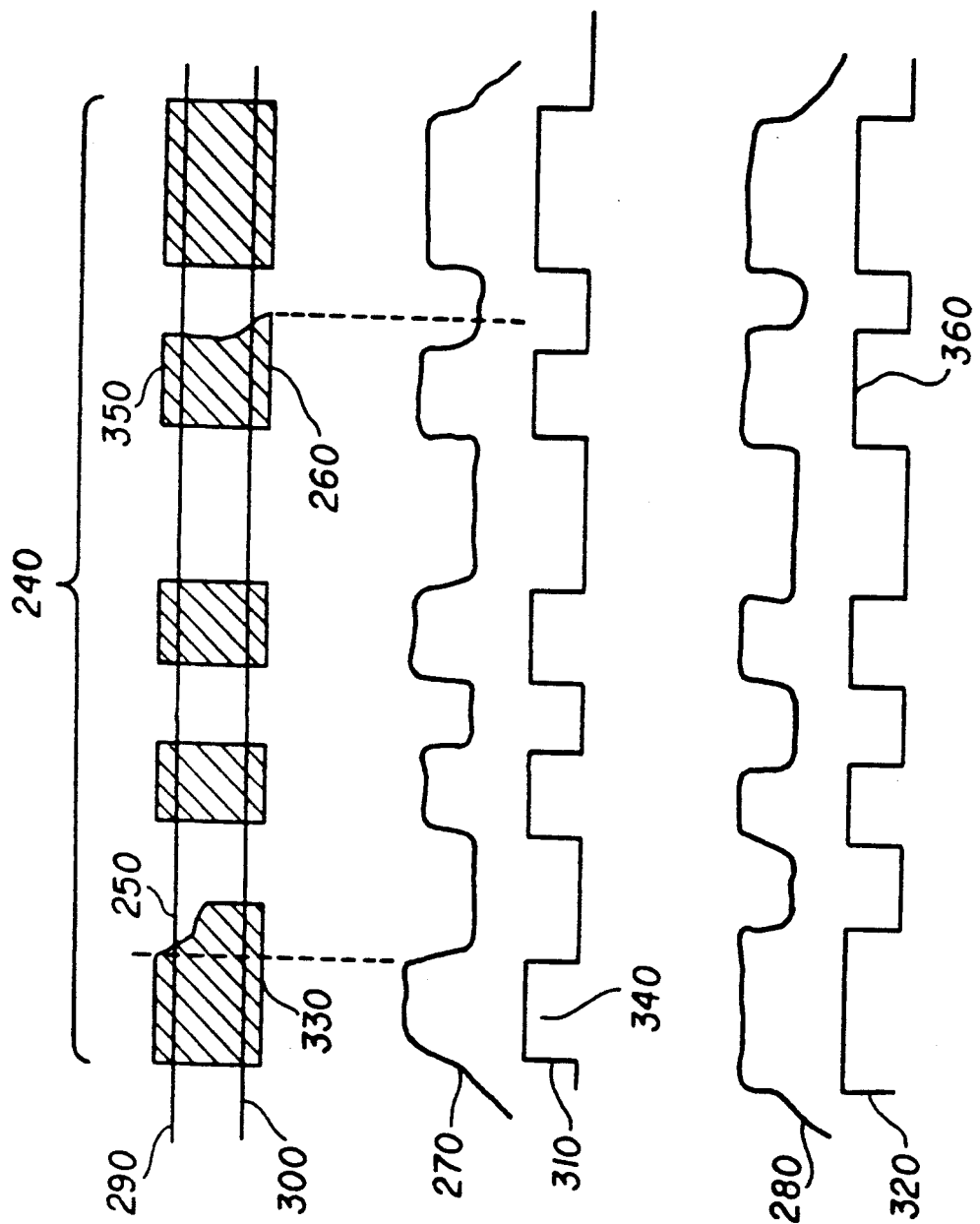
FIGS. 5A and B are a timing diagram illustrating the effects of printing defects and distortion in a bar code scan signal.
Figure 5B:
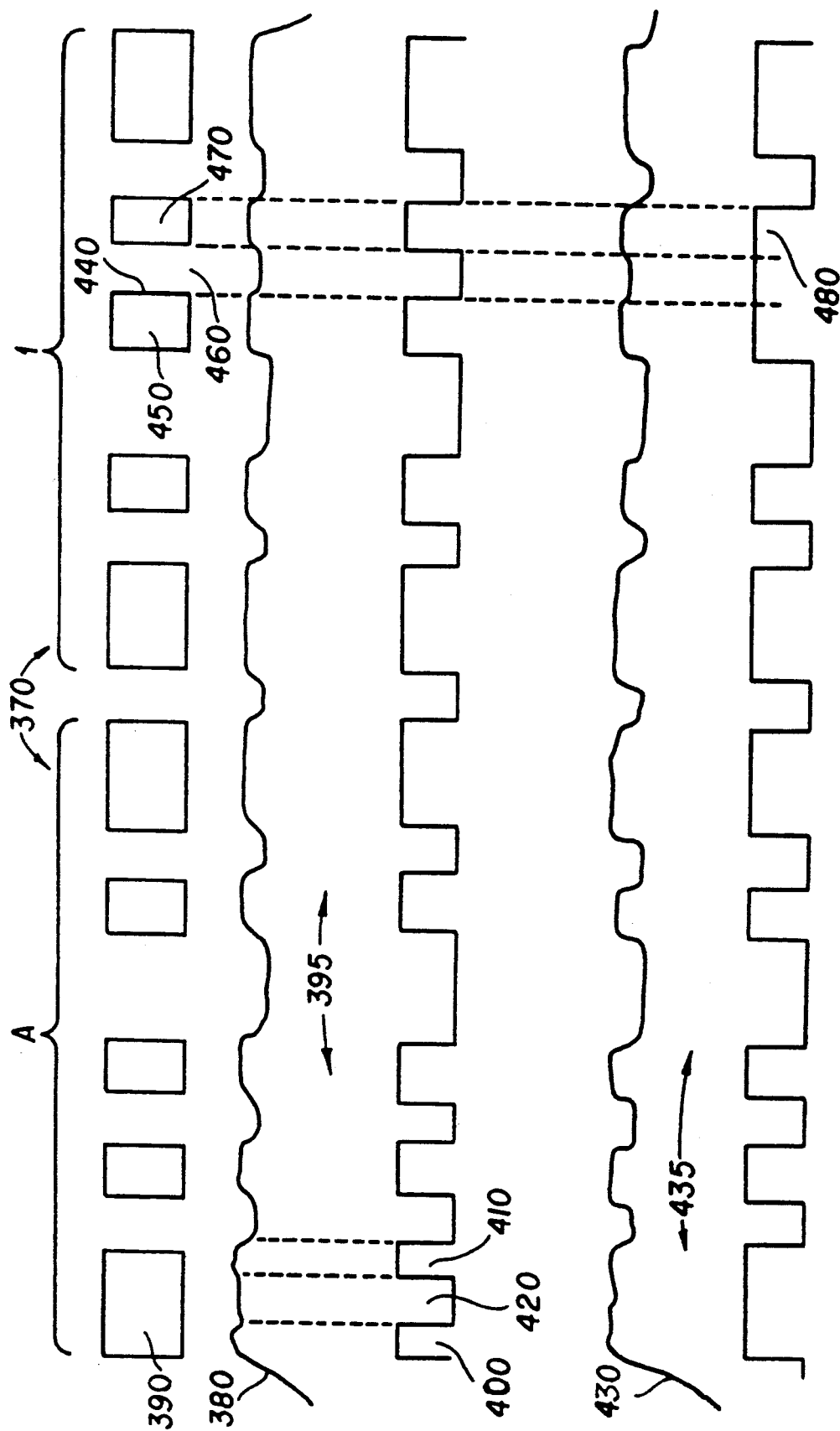

FIGS. 5A and 5B, which are not necessarily drawn to scale, are timing diagrams which illustrate how distortion may prevent readings or lead to inaccurate readings in conventional systems. As will be appreciated, electrical distortion in the analog scan signal can result in a decode failure. For example, in bar code reading devices using an edge detector for digitization, electrical distortion often manifests itself as one of the following four types of failure: a split or divide error, a merge error, a single element misread or edge shift, or a dual element misread.

FIG. 5A depicts a bar code symbol 240 for the character "A" in Code 39 format. FIG. 5A further illustrates the effect of printing defects 250, 260 on a pair of analog scan signals 270, 280 corresponding to two distinct scan paths 290, 300 respectively. Pulse trains 310, 320 graphically depict the digital representations of scan signals 270, 280, respectively. During the scanning of scan path 290, defect 250 causes wide element 330 to be misread as a narrow pulse 340. Similarly, during the scanning of scan path 300, defect 260 causes narrow element 350 to be mistaken as a wide pulse 360.

FIG. 5B is a timing diagram which depicts individual elements of a bar code symbol 370 whose message contains two characters, "A" and "1". Analog scan signal 380 results from a first scanning of the bar code symbol with a reading device while pulse train 395 is the digital representation of scan signal 380. Similarly, analog scan signal 430 results from a second scanning of the same bar code symbol while pulse train 435 is the digital representation of scan signal 430. During the first scan, distortion in analog scan signal 380 results in a split error wherein the decoder, for example, mistakes the single wide element 390 as three elements, namely, a pair of narrow dark bars represented by pulses 400, 410 surrounding a narrow light bar represented by signal 420.

During the second scan, distortion in analog signal 430 results in a merge error. In this merge error, the edge detector, for example, does not recognize a downward sloping signal corresponding to boundary 440, and causes the decoder to misinterpret elements 450, 460 and 470 as a single wide bar, represented by pulse 480.

Both the split and merge errors described above yield an incorrect number of bar code elements. A merge error causes three elements to be detected as one. A split error causes a single element to be detected as three.

Distortion may also cause the width of a given element to be misrepresented without altering the total number of elements. For example, a single wide element may be misrepresented as a single narrow element, causing a single element misread. Additionally, an adjacent narrow element may be misrepresented as a wide element resulting in a dual element misread.

As explained above, prior art scanning systems abort the decoding process when encountering any of the above errors, discarding all information contained in the raw digital image. To avoid this inefficiency, the present invention uses the information contained in distorted raw digital images obtained from a plurality of scans to decode the bar code symbol.

Figure 6A:
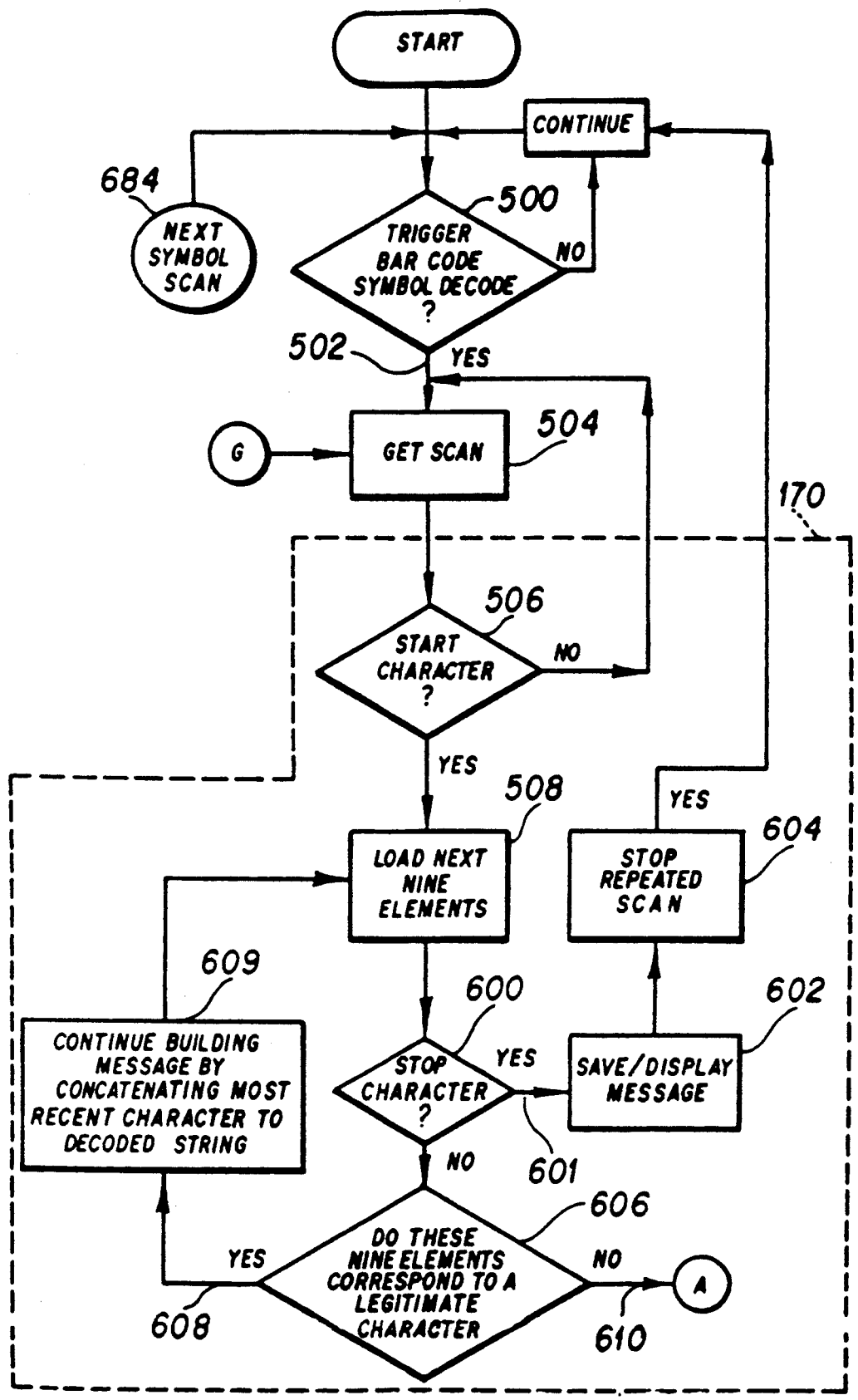
FIGS. 6A, B, C and D are a flow chart depicting a method for decoding a bar code symbol from multiple scan signals.

Referring now to the flow chart of FIG. 6A, operation of the system is initiated by triggering the bar code reader to read a bar code (500). Upon detecting that the bar code reader has been triggered (500, 502), the entire bar code symbol is scanned by performing a sweep of the symbol (504) to produce a raw digital image of the symbol. Portion 170 of this flow chart depicts a method for deciphering the message represented by the raw digital image.

Mere specifically, decoder 180 (FIG. 4) first searches (506) for a start character. Upon detection of a start character, the decoder loads (508) the next nine elements for comparison against the list of legitimate characters depicted in FIG. 2. Specifically, after the loading (508) of each set of nine elements, the systems determines (600) whether the nine elements previously loaded represent a stop character (600, 606), in which case the message is saved (602), the scanning process is stopped (604) and the system waits for the reading device to be triggered (500) and for the next bar code to be read. In the event that the previously loaded nine elements do not represent a stop character (600, 606), a test is performed (606) to determine whether the nine elements correspond to a legitimate character. This test involves an element by element comparison, by a well known method, of these nine elements with the elements represented by legitimate characters. Thus, as long as each set of nine elements corresponds to a legitimate character (606, 608), the system continues to build (609) the message, character by character, from the raw digital image. This continues until receipt of a stop character (600, 601), at which point the decoder stores the message corresponding to the bar code symbol and prepares for the next bar code symbol.

However, if prior to receiving a stop character, an illegimate character is encountered (606, 610), the system determines whether a previous scan exists (620). Prior art decoders simply abort the decode attempt upon the detection of any read or decode failure, discarding all information contained in the most recent raw digital image. Such prior art decoders repeat the scanning process until the entire message can be decoded from a single scan, if possible.

Specifically, upon determining that the nine elements previously read do not represent a legitimate character (606, 610), i.e., a decode failure occurred, the decoder determines (620) whether this is the first partially decoded scan. If so, the partially decoded message (622) as well as the raw distorted digital image (624) are saved. The decoder then proceeds to decode the next scan (626, 504) until either another partially decoded scan occurs (610) or a completely decoded scan occurs (601).

If a partial decode occurs first, the partially decoded message (628) and the raw distorted digital image (630) are saved. The decoder then proceeds to determine (632) whether this most recent partial decode failed on the same character as the previously stored partial decode. If so, the partially decoded message and the raw distorted digital image from the most recent scan replaces (634) the earlier scan data. Since the decode failed on the same characters, correction is not possible without further scans. Thus, the decoder proceeds (636, 504) to decode subsequent scans. However, if each decode attempt failed on a different character (632, 633), the decoder next compares (638) the characters of the shortest partially decoded message against the corresponding characters of the longer partially decoded message to make sure that the portions which each scan has identified as correct truly are correct, i.e., that the corresponding characters are the same. If the characters are not the same (638, 640), then at least one of these decodes has misidentified a character. The decoder assumes that the longer message is correct and saves (640) the partially decoded message and the raw distorted digital image from the most successful scan. Again the decoder proceeds to analyze subsequent scans (646, 504; 647, 504).

Alternatively, if the corresponding characters are the same (638, 650), thus confirming that the characters identified as correct in each scan are indeed correct, the decoder proceeds to classify (652, 654, 656) the longer message as relatively clear and the shorter message as relatively distorted. A flag "best" is set to either "1" (654) or "2" (656) depending on which message is longer. The decoder then attempts to correct (658) the defective character element(s) of the raw distorted digital image in the relatively distorted scan based on the digital image of the relatively clear scan. For reasons to be explained ahead, if the correction fails (660, 662) the decoder saves (664) the scan data from the scan that has the longer decoded sequence. If each of the scans has decoded sequences of equal length, the most recent scan is saved. The system then proceeds to analyze another scan (666, 504).

If the element correction succeeds (660, 668), the decoder then corrects the message containing the elements (668). The decoder then begins decoding the next nine elements (670) of the raw digital image which follow the corrected elements by testing for a stop character (672) and for legitimate characters (674). As each character is successfully decoded, the corresponding partially decoded message improves (676). If a stop character is encountered (672, 678), the message is saved (678), the scanning process is terminated (680) and the system is readied for the next symbol (682, 684).

However, if yet another decode failure occurs, i.e., the current nine elements do not correspond to a legitimate character (674, 686), the decoder performs a toggling process and replaces (688, 690) the originally received scan data with its corresponding corrected scan data, depending on the value of the flag "best". Treating the corrected scan data as any other unsuccessful scan data, the decoder repeats (692, 694) the above described process of comparing partial scans for correlating the two sets of scan data.

Figure 6B:
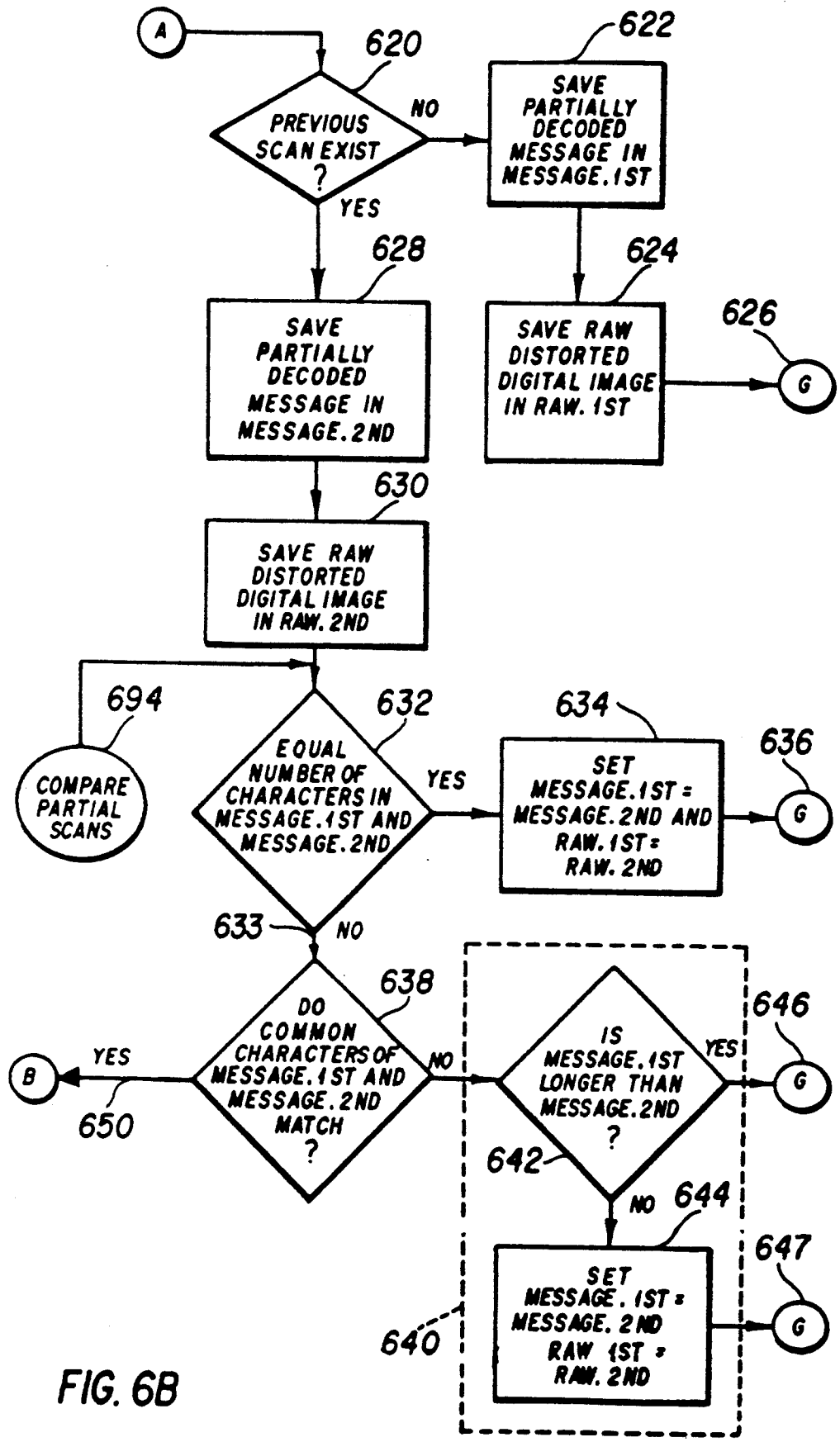

More specifically, the partial scans are compared as follows. The corrected partially decoded message is compared to the companion partially decoded message to determine (632 of FIG. 6B) whether both partially decoded messages failed on the same character and, if not (632, 633), whether the decoded messages are consistent (638). Assuming both conditions are satisfied, the decoder proceeds (650) to again attempt (660) to correct the relatively distorted scan using information from the relatively clear scan (652, 654, 656, 658).

As will be appreciated by one skilled in the art, the decoder continues to toggle back and forth correcting each scan using information from the other scan until the entire symbol is decoded or a non-correctable failure occurs.

Illustratively, three instances of such non-correctable failure in which the decoder will be unable to extract the message from a given pair of partially decoded scans are as follows. First, if at anytime during the iterative process of correcting one scan from the other scan, a character is reached (632, 634) which cannot be decoded from either of the two raw digital images, one of the scans must be discarded (634) and a new scan sought (636). In the preferred embodiment, the decoder selects and saves (634) the most recent scan data, including any corrections. The more recent scan data is generally preferable since it is more likely to be on the same scale as the next acquired scan data. For example, throughout the decode procedure, the operator may be moving the reading device progressively closer to the bar code symbol. Since scans taken at closer range will depict the bar elements as longer than scans taken at a greater distance, it is preferable to save the more recent raw digital image since it is more likely to have been acquired at the same range as the next digital image.

The second type of decode failure occurs when the common characters of the partially decoded messages do not match (638, 640). In this case, the decoder of the preferred embodiment assumes that the scan which resulted in the most decoded characters is correct, and accordingly saves (640) its scan data, discarding the shorter scan and then seeks a new scan (646, 647).

The third type of failure occurs when the decoder is unable to correct (660, 662) a flawed character using the more successful scan image. Again, the decoder assumes the more successful scan is correct, saves (664) the data and seeks a new scan (666).

Figure 6C:
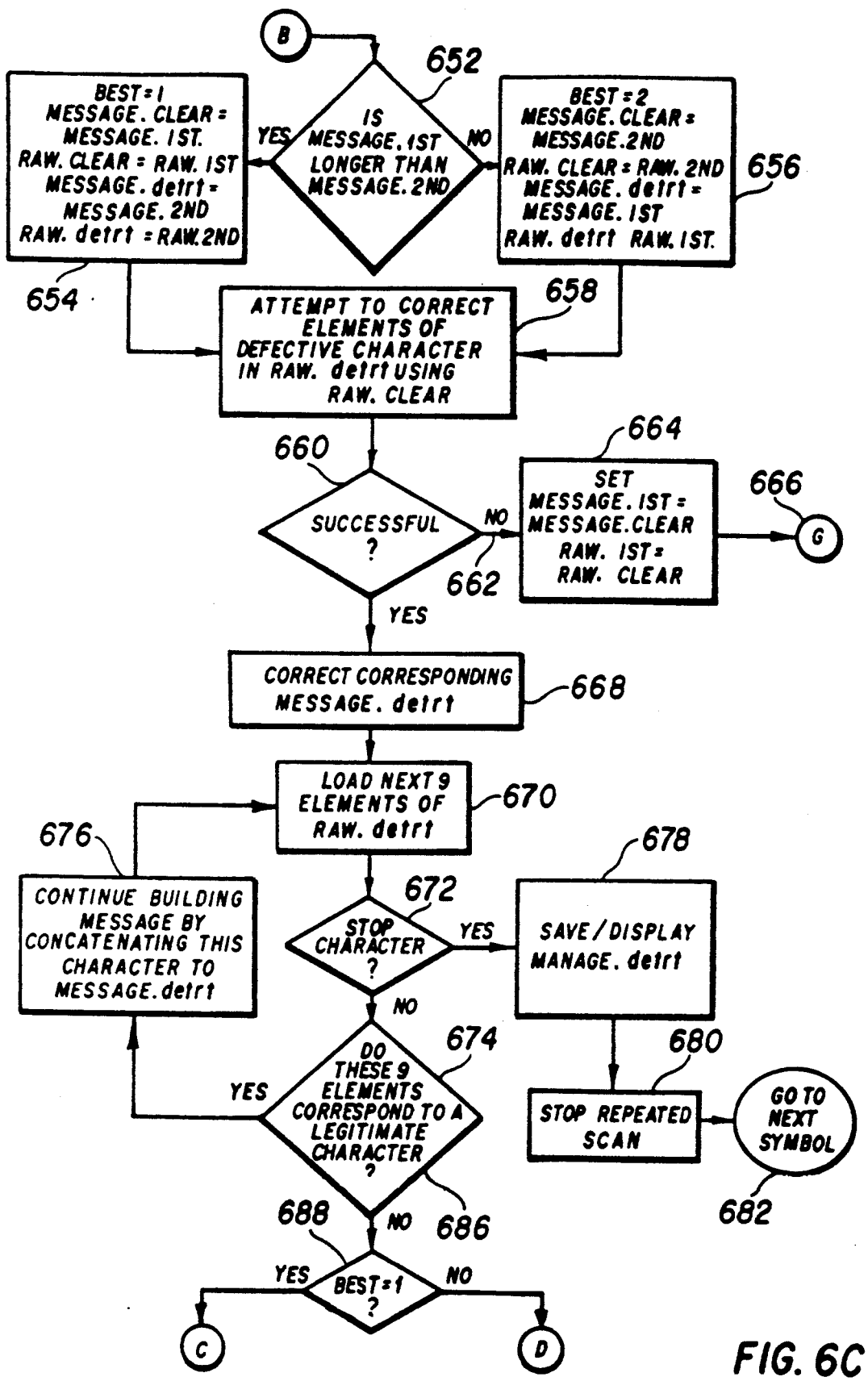
Figure 6D:
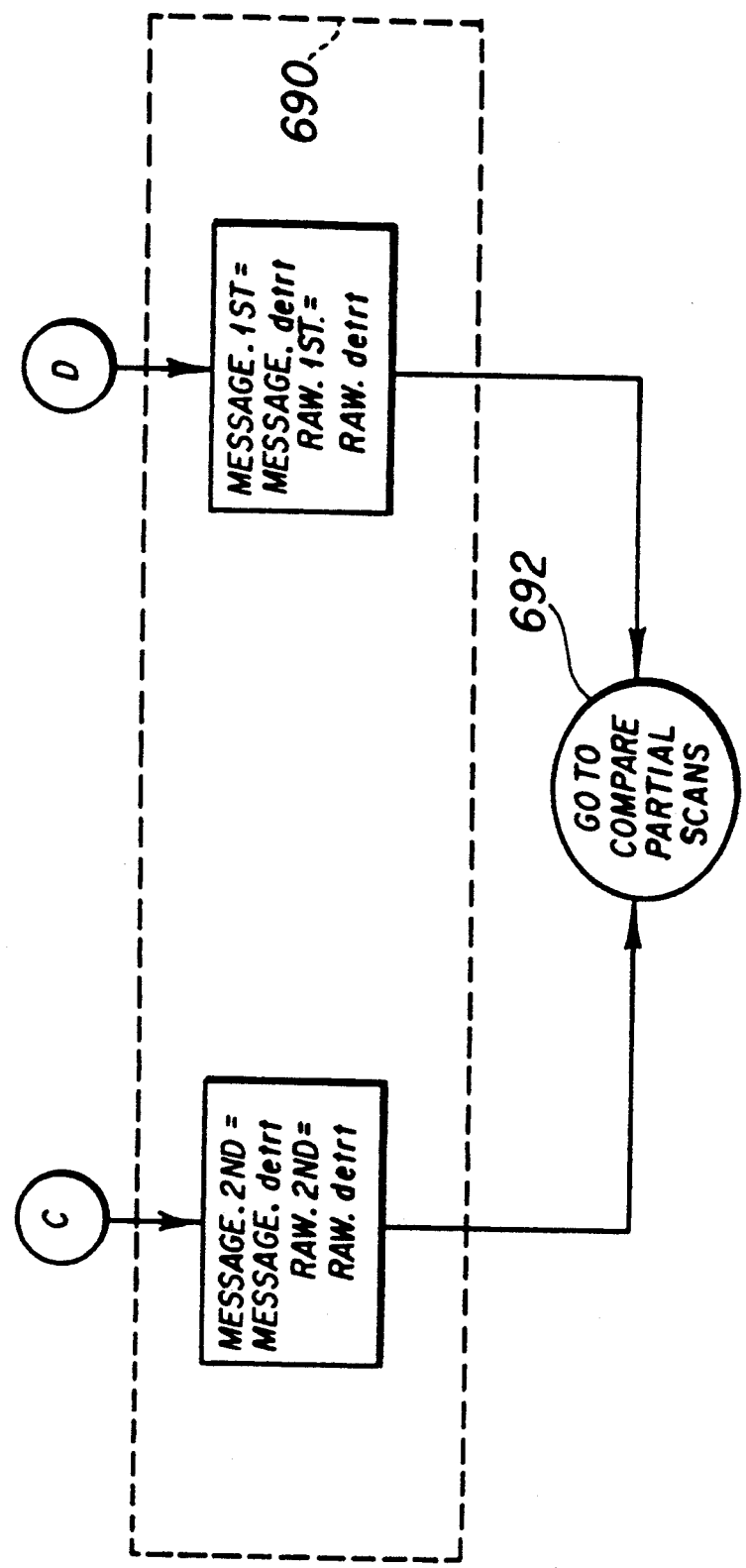
Figure 7A:
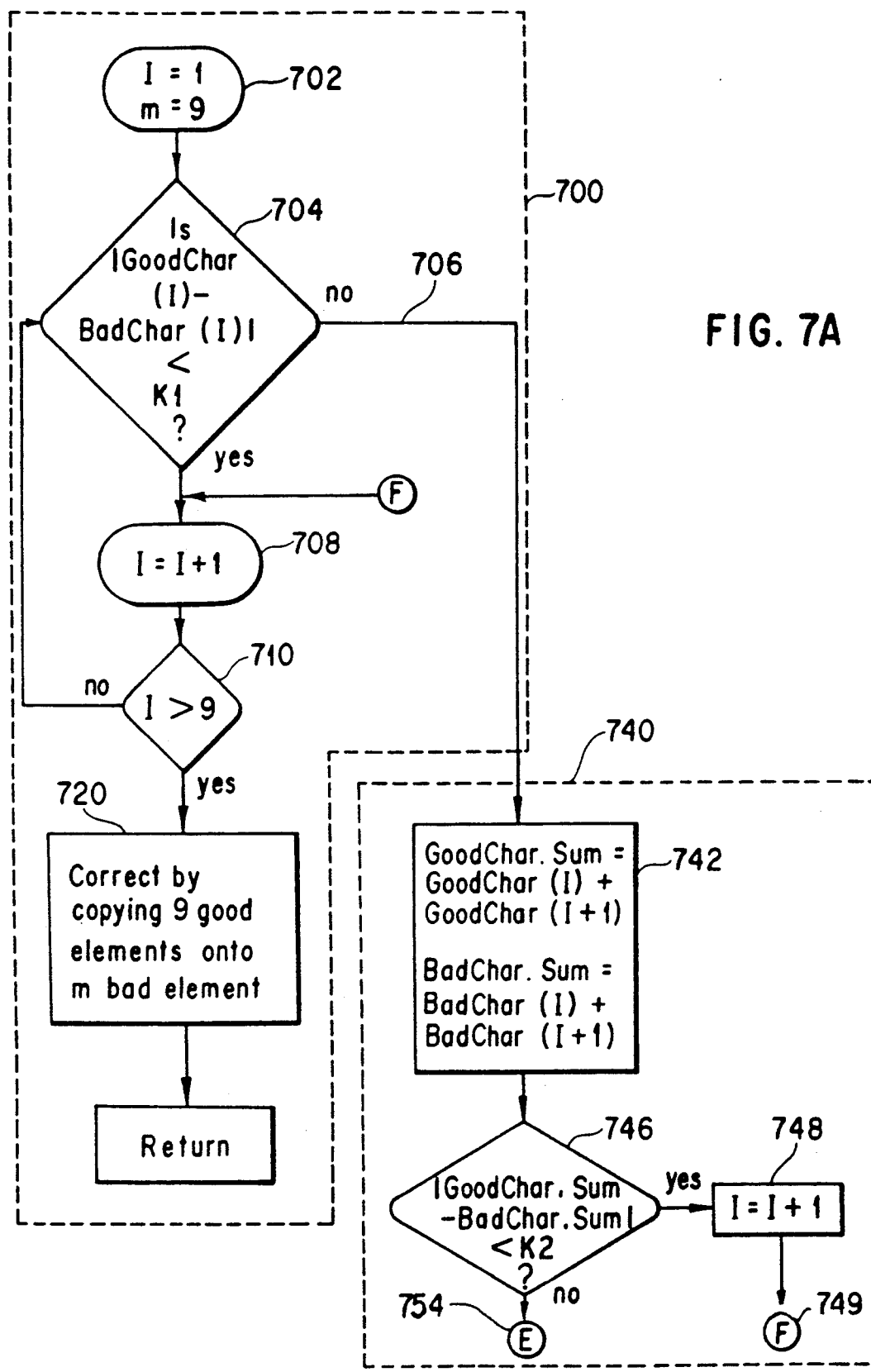
FIGS. 7A and B are a flow chart depicting a method for correcting elements of a distorted character image.
Figure 7B:
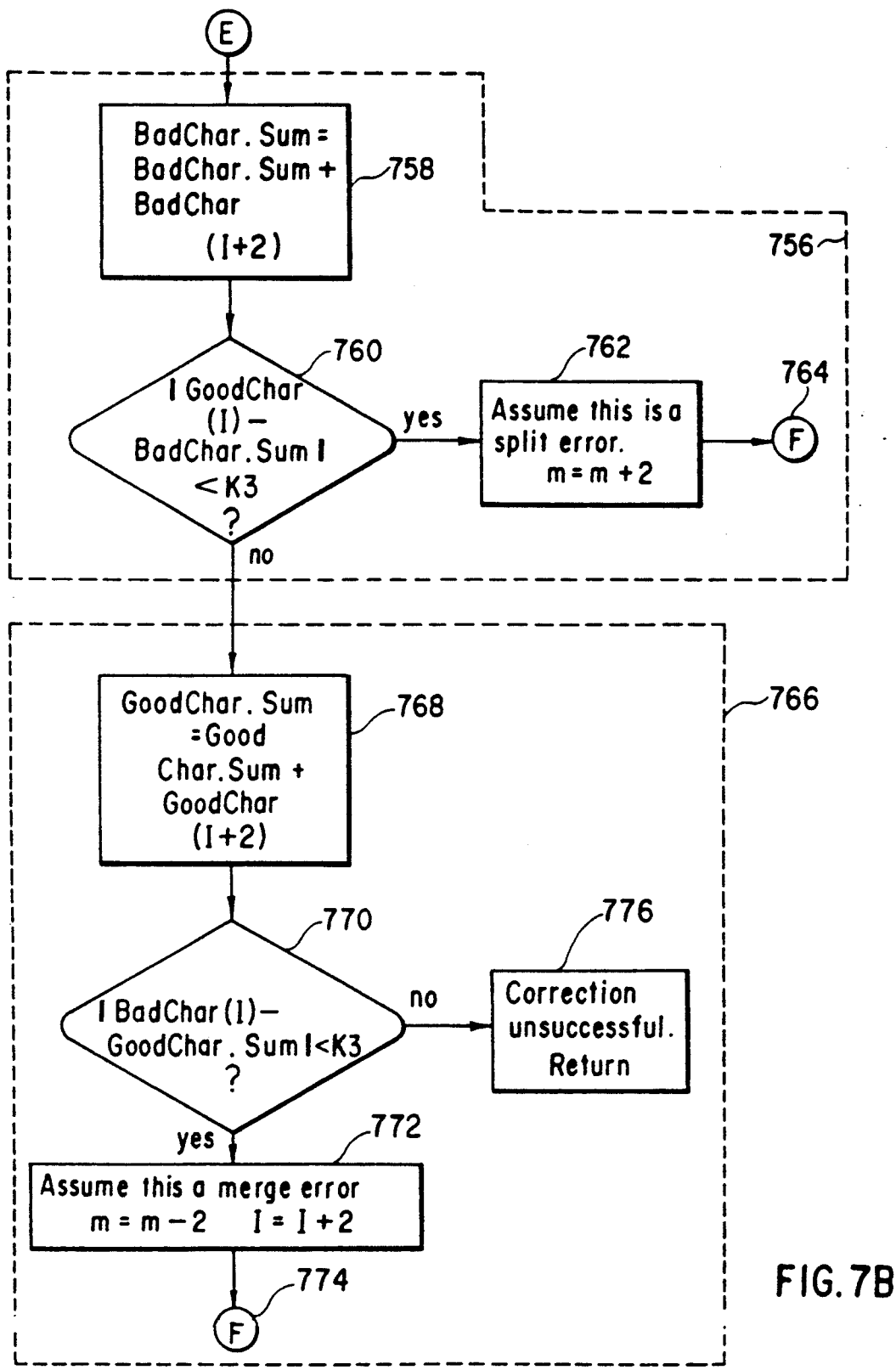

FIGS. 7A and 7B set forth a flow chart depicting the method for correcting the elements of a defective character identified in box 658 in FIG. 6C. The preferred embodiment for performing this correction (see 658 of FIG. 6) involves analyzing the digital image of the defective character to determine whether a merge, split, single element or dual element error has occurred. These types of errors have been identified and described in conjunction with FIGS. 5A and 5B. The correction process begins by sequentially comparing (700) each element of the defective character against the corresponding element of the relatively clear scan to find the first distorted element.

More specifically, the system is first initialized (702) by setting the variable I, which corresponds to the elements in the legitimate character, to one, and the variable M, which corresponds to the elements in the illegitimate character, to nine. For each element, the decoder calculates (704) the absolute value of the difference between the element counts of the relatively clear and the relatively distorted images. If this difference equals or exceeds a specified threshold, K1 (704, 706), the decoder assumes that this particular element of the defective character is defective. If after so analyzing the first nine elements (708, 710) of the defective character, the decoder has not found a defective element, the decoder performs a correction by copying the nine good elements onto the M bad elements (720). In this case, a borderline reading or decoding may have occurred and the correction is considered successful. The error correction method then proceeds as described above (660, 668 of FIG. 6C).

In the more likely event that a defective element is found, the decoder tests (740) for a single or dual element misread error. As will be appreciated by one skilled in the art, if such an error has occurred (746, 748), the sum of the counts of the defective element and the counts of the next adjacent element will be approximately equal to the sum of the counts of the corresponding element in the relatively clear scan. If such an error has occurred the variable I is incremented (748) and the correction process continues (749, 708).

If such a misread error has not occurred, the decoder proceeds (754) to check (756) for a split error. Specifically, the decoder first calculates (758) the sum of the element counts for the defective element and its next two neighboring elements. If this sum is approximately equal (760, 762) to the count of the single element of the relatively clear scan corresponding to the identified defective element, the decoder assumes a split error has occurred and increments the variable M by two (762). If so, the counts of the identified defective element and its two neighbors are used as a single element in lieu of the three elements. The system then continues the correction process (764, 708).

Finally, if such a split error is not found, the decoder checks (766) for a merge error. If the count of the defective element is approximately equal (770, 772) to the sum of three elements (768) of the relatively clear scan, the decoder assumes a merge error has occurred (772). In this event, variable M is decremented by two and variable I is incremented by two, thus permitting the replacement of the single defective count with the three counts from the relatively clear scan. The system then continues the correction process (774, 708). Alternatively, if a merge error is not found, the decoder indicates (776) that the correction attempt was unsuccessful and proceeds as described above (660, 662 of FIG. 6C)

While the invention has been described in conjunction with specific embodiments, it is evident in light of the foregoing description that numerous alternatives, modifications, and variations will be apparent to those skilled in the art. The terms "first" and "second", as they relate to scan signals, digital images and the like are employed for convenience and do not necessarily indicate the relative time of occurrence of such signals.

What is claimed is:

1. In a method for decoding bar code symbols in which a bar code reader and associated components scan a bar code symbol having a succession of linear elements of different light reflectivity, produce a representation of the symbol and attempt to decode the representation of the symbol in order to produce a legitimate data character message containing legitimate data characters which are decodable, all non-decodable characters being illegitimate, the improvement comprising the steps of:

storing a first representation of the bar code symbol corresponding to a first scan path through said symbol;

decoding at least one of said data characters in said first representation to determine whether it includes any illegitimate data characters;

determining that said first representation includes at least one illegitimate data character;

storing a second representation of the bar code symbol corresponding to a second path through said symbol;

decoding at least one of said data characters in said second representation to determine whether it includes any illegitimate data characters;

comparing corresponding decoded characters of said first and second representations and replacing at least one, but fewer than all, of the elements of an illegitimate data character of said first representation with at least one element of a corresponding data character of said second representation to form an improved representation.

2. The improved method of claim 1 further comprising the step of improving said second representation using said improved representation to form a further improved representation.

3. The improved method of claim 2 further comprising the step of defining a relatively clear representation and a relatively distorted representation from said improved representation and said further improved representation, wherein said relatively clear representation comprises at least one undistorted element corresponding to a distorted element in said relatively distorted representation.

4. The improved method of claim 3 further comprising the step of correcting said relatively distorted representation using said relatively clear representation.

5. The improved method of claim 4 wherein said step of correcting results in an additional improved representation containing only legitimate characters.

6. The improved method of claim 4 further comprising the steps of repeatedly redefining said improved representation and said further improved representation as relatively clear and relatively distorted representations and repeatedly attempting to correct and decode said relatively distorted representation until either the decode is successful or neither improved representation can be defined as relatively clear.

7. The improved method of claim 3 further comprising the step of correcting said relatively clear representation using said relatively distorted representation.

8. The improved method of claim 7 wherein said step of correcting results in an additional improved representation containing only legitimate characters.

9. The improved method of claim 7 further comprising the steps of repeatedly redefining said improved representation and said further improved representation as relatively clear and relatively-distorted representations and repeatedly attempting to correct and decode said relatively clear representation until either the decode is successful or neither improved representation can be defined as relatively clear.

10. In a method for decoding bar code symbols in which a bar code reader and associated components scan a bar code symbol having a succession of linear elements of different light reflectivity, produce a representation of the symbol and attempt to decode the representation of the symbol in order to produce a legitimate character message containing a plurality of legitimate data characters which are decodable, all nondecodable characters being illegitimate, the improvement comprising the steps of:

comparing a plurlayt of representations obtained from different scanning paths through the same bar code symbol;

decoding at least one of the data characters in one representation;

determining that at lest one representation includes an illegitimate data character; and modifying at least one illegitimate data character in one representation, said modifying comprising replacing at least one, but fewer than all, of the elements of an illegitimate character with at least one element of a legitimate character from a corresponding position in another representation to result in an improved representation.

11. The improved method of claim 10 wherein said step of replacing results in said improved representation containing only legitimate characters.

12. The improved method of claim 10 further comprising the steps of comparing said improved representation with one of the other representations and forming a further improved representation.

13. The improved method of claim 12 wherein said step of comparing results in said further improved representation containing only legitimate characters.

14. The improved method of claim 12 further comprising the steps of classifying said improved representation and said further improved representation as a relatively clear representation and a relatively distorted representation, wherein said relatively clear representation includes at least one undistorted element corresponding to a distorted element in said relatively distorted representation.

15. The improved method of claim 14 further comprising the step of correcting one of said relatively clear representation and said relatively distorted representation based on the other of said relatively clear representation and said relatively distorted representation, thereby forming an additional improved representation.

16. The improved method of claim 15 wherein said step of correcting results in said additional improved representation containing only legitimate characters.

17. The improved method of claim 15 further comprising the step of repeatedly redefining said improved representation and said further improved representation as relatively clear and relatively distorted representations.

18. The improved method of claim 17 comprising the step of decoding at least one of said repeatedly redefined relatively clear and relatively distorted images until a correct decoded representation is produced wherein said step of repeatedly redefining results in a representation containing only legitimate characters.

19. A method of decoding a bar code symbol that may contain distortion, said symbol including a sequence of characters, each character including a plurality of individual elements of different light reflectivity, with a set of predetermined patterns of elements representing illegitimate characters, while all other patterns represent legitimate characters, comprising the steps of:

storing a first representation of said bar code symbol derived from scanning entirely through said bar code symbol;

storing a second representation of said bar code symbol derived from scanning entirely through said bar code symbol;

improving said first representation using said second representation to form an improved representation;

wherein said step of improving said first representation comprises the step of replacing at least one element of a distorted character of said first representation with at least one element of a corresponding character of said second representation to form said improved representation;

wherein said step of replacing results in said improved representation containing only legitimate characters; and further comprising, if the entire bar code symbol is not decodable using said improved representation, the step of attempting to improve, by element replacement, said second representation using said improved representation to form a further improved representation.

20. The method of claim 19 further comprising, if said step of attempting to improve said second representation was successful, the step of:

attempting to decode the entire bar code symbol using said further improved representation.

21. The method of claim 19 further comprising, if the entire bar code symbol is not decodable using said further improved representation, the step of:

attempting to define a relatively clear representation and a relatively distorted representation from said improved representation and said further improved representation, wherein said relatively clear representation comprises at least one undistorted element corresponding to a distorted element in said relatively distorted representation.

22. The method of claim 21 further comprising the step of:

attempting to improve, by element replacement, said relatively distorted representation using said relatively clear representation.

23. The method of claim 22 further comprising, if said step of attempting to improve said relatively distorted representation is successful, the step of:

attempting to decode said relatively distorted representation.

24. The method of claim 22 further comprising, if said relatively distorted representation cannot be decoded, the step of:

repeatedly attempting to redefine said improved representation and said further improved representation as relatively clear and relatively distorted representations and repeatedly attempting to improve and decode said relatively distorted representation until either the decode is successful or neither improved representation can be defined as relatively clear.

25. The method of claim 21 further comprising the step of:

attempting to improve, by element replacement, said relatively clear representation using said relatively distorted representation.

26. The method of claim 25 further comprising, if said step of attempting to improve said relatively clear representation is successful, the step of:

attempting to decode said relatively clear representation.

27. The method of claim 25 further comprising, if said relatively clear representation cannot be decoded, the step of:

repeatedly attempting to redefine said improved representation and said further improved representation as relatively clear and relatively distorted representations and repeatedly attempting to improve and decode said relatively clear representation until either the decode is successful or neither improved representation can be defined as relatively clear.

28. In a method for decoding bar code symbols in which a bar code reader and associated components scan a bar code symbol having a succession of linear elements of different light reflectivity, produce a representation of the symbol and attempt to decode the representation of the symbol in order to produce a legitimate character message containing legitimate characters which are decodable, all non-decodable characters being illegitimate, the improvement comprising the steps of:

storing a first representation of the bar code symbol corresponding to a first scan path through said symbol;

decoding said first representation to determine whether it includes any illegitimate characters;

determining that said first representation includes at least one illegitimate character;

storing a second representation of the bar code symbol corresponding to a second scan path through said symbol;

decoding said second representation to determine whether it includes any illegitimate characters;

comparing corresponding decoded characters of said first and second representations;

replacing at least one element of an illegitimate character of said first representation with at lest one element of a corresponding character of said second representation to form an improved representation; and improving said second representation using said improved representation to form a further improved representation.

29. The improved method of claim 28 further comprising the step of defining a relatively clear representation and a relatively distorted representation from said improved representation and said further improved representation, wherein said relatively clear representation comprises at least one undistorted element corresponding to a distorted element in said relatively distorted representation.

30. The improved method of claim 29 further comprising the step of correcting said relatively distorted representation using said relatively clear representation.

31. The improved method of claim 30 wherein said step of correcting results in an additional improved representation containing only legitimate characters.

32. The improved method of claim 30 further comprising the steps of repeatedly redefining said improved representation and said further improved representation as relatively clear and relatively distorted representations and repeatedly attempting to correct and decode said relatively distorted representation until either the decode is successful or neither improved representation can be defined as relatively clear.

33. The improved method of claim 29 further comprising the step of correcting said relatively clear representation using said relatively distorted representation.

34. The improved method of claim 33 wherein said step of correcting results in an additional improved representation containing only legitimate characters.

35. The improved method of claim 33 further comprising the steps of repeatedly redefining said improved representation and said further improved representation as relatively clear and relatively distorted representations and repeatedly attempting to correct and decode said relatively clear representation until either the decode is successful or neither improved representation can be defined as relatively clear.

36. In a method for decoding bar code symbols in which a bar code reader and associated components scan a bar code symbol having a succession of linear elements of different light reflectivity, produce a representation of the symbol and attempt to decode the representation of the symbol in order to produce a legitimate character message containing legitimate characters while are decodable, all non-decodable characters being illegitimate, the improvement comprising the steps of:

comparing a plurality of representations obtained from different scanning paths entirely through the same bar code symbol; and modifying at least one illegitimate character in one representation based on at least one legitimate character in a corresponding position in another representation, wherein said step of modifying comprises replacing at least one element of an illegitimate character with at least one element of a legitimate charade to result in an improved representation;

comparing said improved representation with one of the other representations and forming a further improved representation;

classifying said improved representation and said further improved representation as a relatively clear representation and a relatively distorted representation, wherein said relatively clear representation includes at least one undistorted element corresponding to a distorted element in said relatively distorted representation, repeatedly attempting to correct and further comprising the step of correcting one of said relatively clear representation and said relatively distorted representation based on the other of said relatively clear representation and said relatively distorted representation, thereby forming an additional improved representation.

37. The improved method of claim 36 wherein said step of correcting results in said additional improved representation containing only legitimate characters.

38. The improved method of claim 36 further comprising the step of repeatedly redefining said improved representation and said further improved representations as relatively clear and relatively distorted representations.

39. The improved method of claim 38 comprising the step of decoding at least one of said repeatedly redefined relatively clear and relatively distorted representations until a decoded representation is produced containing only legitimate characters.

* * * * *